Patented Sept. 14, 1954

2,689,235

UNITED STATES PATENT OFFICE 2,689,235

NONEFFLORESCENT LATEX COMPOSITIONS AND METHOD OF MAKING THE SAME

Walter A. Henson, Mark E. Kelly, Jr., Dudley A. Taber, and Robert L. Wise, Midland, Mich., and Donald D. Schurr, Bay Village, Ohio, assignors to The Dow Chemical Company, Midland, Mich., a corporation of Delaware No Drawing. Application February 2, 1953, Serial No. 334,724

16 Claims. (Cl. 260—29.7)

This invention relates to water-emulsion paints made from aqueous latexes of rubbery polymers. It relates especially to an improved latex paint which is non-efflorescent, i. e. which, when deposited as a thin layer on a support and dried, does not develop white spots, or streaks, or a salty incrustation on its surface. It also pertains to a method of making non-efflorescent latex paints; particularly, to the preparation and/or conditioning of latexes to render them suitable for use in such paints. It pertains more particularly to steps for the treatment of a latex, or latex paint, that tends to effloresce so as to render the same non-efflorescent.

Water-emulsion paints have been made from film-forming latexes of rubbery polymers, e. g. an aqueous colloidal dispersion of a copolymer of styrene and butadiene, by adding thereto finely divided paint pigments and fillers such as lithopone, titanium dioxide, china clay and mica. Such latex paints have become very popular because of their freedom from toxic, flammable solvents, ease of application, speed of drying, ease of cleaning, and resistance to alkali. Latex paints are especially popular for interior decorating purposes because they can be applied quickly by brushing or by rolling, show no lap marks, cover adhere well to a variety of dense and porous subsurfaces, and the painted surface presents an attractive and pleasing appearance.

In some instances, a surface painted with a latex paint develops an unattractive appearance due to the formation, on the exposed surface of the paint film, of a white, salty incrustation, or bloom. This phenomenon and the salty incrustation have been termed "efflorescence." The efflorescence may appear as a frosty deposit of powdery dust on the painted surface. The deposit may be uniform over extensive areas, but is more often splotchy and blotchy. In some instances the deposits are large grained and granular. They may be scattered over the surface in separated eruptions, or may be gathered in clusters. The unpleasant appearance of such efflorescence is especially noticeable on paints which have been deeply tinted with dark colors, but can be seen even on white paints. Efflorescence sometimes forms on a dried film of the unpigmented latex binder. The phenomenon has been observed on films cast from latexes of a variety of different polymer compositions and on a large number of latex paint films having many different pigment compositions.

The efflorescence of latex paint films appears to be aggravated by exposure of the latex paint film to cool air of high relative humidity. The efflorescence forms most rapidly and most severely when the temperature is from 32° to 60° F. and the relative humidity is above 50 per cent, and especially under conditions in which the temperature and humidity undergo variations within, or into, these ranges. Exposure of latex-painted surfaces to such conditions cannot always be avoided, and efflorescence has sometimes occurred on surfaces not known to have been so exposed.

There is a need for a water-emulsion paint which is made from an aqueous latex of a rubbery polymer and which has all of the desirable properties of such paints, but which does not effloresce when deposited as a thin layer and dried to a coating film, even when exposed to conditions most favorable for efflorescence.

An object of this invention is to provide an improved water-emulsion paint, made from an aqueous latex of a rubbery polymer, which, when deposited as a coating film, does not effloresce. Another object is to provide an improved aqueous latex of a rubbery polymer from which a non-efflorescent film can be obtained and from which a non-efflorescent water-emulsion paint can be prepared. A further object is to provide a method of making non-efflorescent latexes and non-efflorescent latex paints. Another object is to provide such method wherein an aqueous latex which has a tendency to effloresce is treated so as to render the same non-efflorescent. A further object is to provide such method wherein a latex paint which has a tendency to effloresce is treated so as to render the same non-efflorescent. Other objects will be evident from the following description of the invention.

We have found that the salty deposit, bloom, or efflorescence, described above, is largely sodium sulfate, usually as its decahydrate, but sometimes as the lower hydrates of sodium sulfate, anhydrous sodium sulfate, or mixtures of these forms, or including other compounds of sodium. Sodium sulfate, or compounds capable of forming sodium sulfate, are known to enter the latex and latex paint compositions, in the operations incidental to their manufacture, as ingredients or constituents of, or impurities in, catalysts, pH buffering agents, emulsifiers, dispersants, stabilizers, pigments, or fillers, etc., which are conventionally employed in making such compositions. When such a composition is spread as a thin layer on a supporting surface, and the volatile components of the composition are removed by evaporation, the sodium sulfate in the composition remains together with the other non-volatile substances in the dried film. Under certain conditions, especially when the film is exposed to cool air of high relative humidity, the sodium sulfate migrates to the exposed surface of the film as the unsightly efflorescence.

We have found that non-efflorescent latex compositions comprising alkali metal ions and sulfate ions may be prepared by introducing ionizable potassium compounds into the compositions in amount such that the weight ratio of potassium to sodium, in the form of water-soluble ionizable compounds thereof in the latex composition, is at least three. The potassium ions necessary to prevent efflorescence may be introduced in the starting materials used in making the latex, or may be added to a latex, or latex paint, after it has been prepared in conventional ways.

More specifically, we have found that a film-forming copolymer latex containing sulfate ions, made by dispersing and polymerizing suitable polymerizable unsaturated compounds, e. g. a mixture of styrene and butadiene, in an aqueous solution comprising catalyst, emulsifier, and pH buffer, the composition of the dispersion being so chosen that the weight ratio of potassium to sodium as water-soluble ionizable compounds in the resulting latex is at least three to one, is, when dried as a thin layer, non-efflorescent. We have found that a latex paint made by suitable pigmentation of such a non-efflorescent latex is also non-efflorescent, providing that the stated ratio of potassium to sodium is retained in the resulting latex paint.

We have further found that a film-forming copolymer latex, containing sodium sulfate, made by dispersing and polymerizing suitable polymerizable unsaturated compounds in an aqueous solution comprising a catalyst, emulsifier and pH buffer, the composition of the dispersion being so chosen that the weight ratio of potassium to sodium as water-soluble ionizable compounds in the resulting latex is less than three to one, and which latex, when dried as a thin layer, tends to effloresce, may be made non-efflorescent by adding to such latex one or more water-soluble ionizable compounds of potassium in amount such as to provide the necessary three parts, or more, by weight of potassium per part of sodium.

We have found that a non-efflorescent latex paint may be made by adding suitable pigments and other ingredients to a non-efflorescent film-forming latex (which has been so prepared, or so treated, that said latex contains at least three parts by weight of potassium per part of sodium) provided that the pigments, additional pigment dispersants, stabilizers, thickeners, preservatives, etc., are so chosen that the resulting paint contains at least three parts of potassium per part of sodium.

We have further found that a latex paint, containing sodium sulfate, which does effloresce and which contains less than three parts of potassium per part of sodium, whether that condition resulted from the use of an efflorescent latex or from the use of pigments and other ingredients which contained an excessive amount of sodium, may be made non-efflorescent by adding a water-soluble ionizable compound of potassium in such amount as to provide the necessary three or more parts by weight of potassium per part of sodium in the latex paint.

PREPARATION OF A NON-EFFLORESCENT LATEX

Improved, non-efflorescent latexes may be made by modifying latexes, and processes for producing latexes, hitherto well known in the art. Conventional latexes are usually prepared by polymerizing a polymerizable compound, or mixture of polymerizable compounds, e. g. styrene and butadiene, while dispersed as an emulsion in an aqueous medium comprising an emulsifying agent, a catalyst for the polymerization, a pH buffering substance, and, sometimes, added electrolytes.

The non-efflorescent latexes of this invention are made in the conventional manner, except that the emulsifying agent, catalyst, pH buffering substance, and added electrolytes, if any, are chosen so that the weight ratio of potassium to sodium, as water-soluble ionizable compounds therein, is at least three to one.

In order to be suitable for use as, or in making, coating compositions, our non-efflorescent latexes are preferably film-forming, i. e. when deposited as a thin layer on a support, and dried, the latex forms a continuous film. Our preferred film-forming latexes are aqueous dispersions of copolymers of mixtures of polymerizable unsaturated compounds, including at least 15 mole per cent of a monovinyl aromatic compound of the benzene series and between 40 and 60 mole per cent of an aliphatic conjugated diolefin. Examples of copolymers which are suitable for latex coating compositions are copolymers of styrene and 1,3-butadiene (herein referred to simply as "butadiene"); copolymers of styrene and isoprene; copolymers of vinyltoluene (nuclear methyl-substituted styrene) and butadiene; copolymers of vinyltoluene and isoprene; copolymers of nuclear ethylstyrene and butadiene or isoprene; copolymers of styrene, butadiene and vinyl chloride; copolymers of styrene, butadiene and vinylidene chloride; and the like. Especially preferred are copolymers of between 60 and 40 mole per cent of a monovinyl aromatic hydrocarbon, e. g. styrene or vinyltoluene, and between 40 and 60 mole per cent of an aliphatic conjugated diolefin, e. g. butadiene or isoprene.

An aqueous dispersion of a suitable copolymer is prepared by polymerizing a mixture of the corresponding monomeric polymerizable compounds, e. g. styrene and butadiene, in proportions relative to each other corresponding to those desired in the copolymer, while dispersed as an emulsion in an aqueous medium. The proportions of monomeric polymerizable compounds and of the aqueous medium are selected to correspond to the polymer solids content desired in the latex, usually such that the polymer solids content of the latex is from about 25 to 70, preferably from about 40 to about 55, per cent by weight. The polymerization of the monomeric compounds is usualy effected by heating the dispersion in a closed vessel, with suitable agitation, to a polymerization temperature, e. g. a temperature of 40–100° C., until the polymerization is substantially complete.

The aqueous medium in which the monomeric compounds are dispersed is a solution usually containing at least one emulsifying agent, a catalyst for the polymerization, and a buffering substance to maintain a desired pH in the aqueous solution. The water-soluble agents used in making latexes by conventional procedures ordinarily contain relatively large proportions of sodium compounds, including sodium sulfate and compounds capable of forming sodium sulfate. For the direct formation of our improved non-efflorescent latexes we employ ionizable potassium and sodium compounds in the emulsion in amounts sufficient for the above purposes and in relative proportions such that the weight ratio of potassium to sodium is at least three.

A variety of suitable emulsifying agents are well known, such as the soluble salts of oleic acid or other soap-forming fatty acids, the soluble salts of lauryl sulfate or other sulfated higher molecular weight alcohols, soluble salts of sulfated fatty glycerides, soluble salts of sulfonated alkylated naphthalene or other sulfonated alkyl-aromatic hydrocarbons, and the like. The emulsifying agent is usually employed in amount corresponding to from 0.5 to 5 per cent of the weight of the polymerizable organic compounds, but can sometimes be used in smaller or larger proportions. Potassium derivatives of the emulsifying agents are preferred, although the sodium derivatives may be used if other potassium compounds are also employed and in amounts adequate to provide the necessary proportions of potassium to sodium.

Suitable catalysts for the polymerization of the dispersed monomeric polymerizable organic compounds are also well known. Peroxygen compounds are commonly used, such as hydrogen peroxide, an organic peroxide, or hydroperoxide, or inorganic persulfates, such as potassium persulfate, sodium persulfate, or ammonium persulfate. Potassium persulfate is usually preferred because of its availability, stability and ease of handling. The catalyst is usually added in amount corresponding to from 0.5 to 4 per cent of the weight of the polymerizable organic compounds, but it can be used in smaller or larger proportions.

The aqueous dispersions of polymerizable organic compounds are preferably made alkaline and maintained alkaline during and after the polymerization by adding, to the aqueous medium, alkalizers and alkali buffering agents of kinds and in quantities such as to provide and maintain a pH greater than 7, preferably between 9 and 10, in the aqueous dispersion. Potassium bicarbonate is preferably employed for this purpose, although other soluble bicarbonates, carbonates, alkali metal hydroxides, alkali metal salts of weak acids, ammonia, amines, hydroxyalkylamines, quaternary ammonium hydroxides, etc., may be used. The alkali metal bicarbonates are preferred because of their moderate alkalinity and good buffering action. An alkaline buffering agent is usually added in such proportion as to raise the pH value to the desired level in the emulsion of polymerizable monomeric organic compounds and enough more is added to neutralize the acidic compounds often formed during the polymerization. For example, if a persulfate catalyst is employed, it is usually reduced during the polymerization with the formation of an equivalent amount of sulfuric acid; in order to maintain an alkaline pH, a quantity of alkali at least equivalent to the expected sulfuric acid is preferably added.

The total concentration of electrolytes (as apart from their functions as catalysts, emulsifying agents, or buffering agents) affects the emulsion of the monomeric compounds, the polymerization thereof, and the latex product. In general, an excessive amount of electrolyte in the emulsion, inter alia, decreases the stability of the dispersion and increases the water-sensitivity of the dried films of the latex coating compositions made therefrom. A limited concentration of electrolyte is, however, desirable because of the effect of electrolyte concentration in the emulsion on the particle size of the dispersed polymer. When additional electrolyte is needed, over and above that present in catalyst, emulsifier and buffer, we prefer to add potassium chloride, potassium sulfate, or potassium pyrophosphate, although potassium salts, or other alkali metal salts, of other strong acids may be used.

The best latexes and those having the most desirable particle size of the dispersed polymer are ones in which the total weight of alkali ions, e. g. potassium and sodium, in the form of water-soluble ionizable compounds present during the polymerization, is between 0.35 and 1 per cent of the combined weight of the said compounds and the copolymer, although smaller or larger proportions may be used.

The presence of an undesirably large proportion of sodium ions in the latex is avoided by limiting the amount and/or the kind of soluble sodium compounds added to the emulsion system. The necessary amount of potassium is provided by using the corresponding amounts of potassium compounds as catalysts, emulsifiers, buffers, etc. Compounds other than those of sodium and potassium may be used, if desired, provided the necessary amount of potassium compounds is also used.

A conventional polymerization recipe which ordinarily yields an efflorescent latex containing sodium sulfate, can be modified so as to obtain a non-efflorescent latex by substituting corresponding potassium compounds for at least a part of the sodium compounds ordinarily employed. An excessive amount of alkali metal compounds can be avoided by providing an adequate amount of potassium compounds and reducing the amount of sodium compounds in the efflorescent latex recipe by substituting ammonia or amine compounds for at least a part of the sodium compounds. Any of these modifications may be employed and a non-efflorescent copolymer latex obtained by methods otherwise well known but improved by the critical restriction that, during the polymerization of the polymerizable unsaturated organic compounds, such amounts of water-soluble compounds of sodium and potassium be employed that the total weight of sodium and potassium therein is from 0.35 to 1 per cent of the combined weight of such compounds and the copolymer, and that the weight ratio of said potassium to said sodium is at least three.

TREATMENT OF AN EFFLORESCENT LATEX

It may not always be feasible to prepare a non-efflorescent latex directly by the improved method just described, or the preparation of the latex may be beyond the control of one wanting to make a non-efflorescent latex coating. An efflorescent latex containing sodium sulfate which is otherwise suitable for use as, or in making, a latex coating composition, and in which the weight ratio of potassium to sodium is less than three, may be made non-efflorescent by adding one or more water-soluble ionizable compounds of potassium in amount such that the necessary weight ratio of potassium to sodium of at least three is obtained, provided that the addition of such potassium compound can be tolerated by the latex.

Any of a wide variety of inorganic or organic water-soluble ionizable compounds of potassium in which potassium is the only ionizable metal cation may be used for this purpose. Examples of suitable potassium compounds are potassium chloride, potassium nitrate, potassium sulfate, potassium bicarbonate, potassium carbonate, potassium hydroxide, potassium phosphate, potassium hydrogen phosphate, potassium dihydrogen phosphate, potassium pyrophosphate, potassium tripolyphosphate, potassium phosphite; potassium acetate and potassium soaps of fatty acids; potassium salts of sulfated higher alcohols; potassium salts of sulfonated alkylaromatic hydrocarbons; potassium alginate; potassium derivatives of proteinaceous materials such as casein or soya protein; potassium salt of carboxymethyl cellulose; potassium salts of carboxy-substituted synthetic polymers such as polyacrylic acid, a styrene-maleic acid copolymer, or a methyl vinyl ether-maleic acid copolymer.

Often the additional potassium compound may be chosen to perform other functions as well as to supply the necessary amount of potassium. Potassium soaps or other potassium wetting agents may beneficially increase the stability of the latex emulsion. Alkaline potassium compounds may be used to raise the pH of the latex, if desired. Potassium salts of colloidal materials may be employed as protective colloids, or as viscosity control agents.

The addition of electrolytes to a latex emulsion usually has a tendency to reduce the stability of the latex. However, polymer latexes generally can tolerate considerably more electrolyte after the polymerization is complete than could be tolerated during the polymerization. The tendency of added electrolytes to reduce the stability of the latex emulsion may be partially compensated by adding a further amount of an emulsifying or dispersing agent, but we prefer to limit the amount of electrolyte present in the treated latex, preferably so that the sum total weight of potassium and sodium, calculated as elements, in the form of water-soluble ionizable compounds thereof, is not more than about 2.5 per cent of the total weight of the non-volatile substances in the dispersion; i. e. is not more than about 2.5 per cent of the combined weight of such compounds and the copolymer.

PREPARATION OF A NON-EFFLORESCENT PAINT

Improved, non-efflorescent paints may be made by adding pigments, pigment extenders, fillers and other paint ingredients to a non-efflorescent film-forming copolymer latex that has been prepared as hereinbefore described.

Any pigment, pigment extender or filler which is known to be suitable for making latex paints is suitable for making an improved non-efflorescent latex paint. Such materials include lithopone, titanium dioxide, zinc sulfide, iron oxides, mica, china clay, mineral silicates, organic dyes and colored pigments, lakes, etc.

In addition to the pigments, etc., other substances are usually added to the latex in making a latex paint. These include protective colloids such as a partially hyrolyzed polymer of vinyl acetate, a water-soluble cellulosic ether (methyl cellulose), proteinaceous materials (casein), alginates, etc.; anti-foamers such as pine oil; plasticizers such as tributyl phosphate; preservatives such as sodium pentachlorophenate; reodorants; etc.

The paint is usually formulated to contain from 30 to 70, preferably from 40 to 65, per cent by weight of total solids, which solids contains from 15 to 100 parts of polymer per 100 parts, by weight, of pigment.

Our improved, non-efflorescent latex paints may be made by adding such pigments, pigment extenders, fillers, and other paint-making ingredients to a non-efflorescent latex of a film-forming copolymer that the resulting latex paint, if it contains sulfate ions and water-soluble ionizable compounds of sodium, also contains water-soluble compounds of potassium in such amounts that the ratio, by weight, of potassium to sodium in such compounds is at least three.

Alternatively, non-efflorescent latex paints may be made from an efflorescent latex, by adding, together with suitable paint-making materials, a water-soluble ionizable compound of potassium in such an amount that the resulting latex paint contains at least three parts by weight of potassium per part of sodium as ionizable potassium and sodium compounds.

TREATMENT OF AN EFFLORESCENT PAINT

A preformed efflorescent latex paint, which contains sodium sulfate, and is otherwise suitable for use as a coating composition, and in which the weight ratio of potassium to sodium is less than three, may be made non-efflorescent by adding a water-soluble ionizable compound of potassium in such amount that the necessary weight ratio of potassium to sodium of at least three is obtained, provided that the addition of such potassium compounds can be tolerated by the latex paint.

Suitable potassium compounds are those hereinbefore described for use in treating efflorescent latexes to render the same non-efflorescent. The preferred compounds of potassium are those which have the least effect, other than the elimination of efflorescence, on the properties of the paint. Potassium tripolyphosphate is especially well adapted for the purpose of increasing the potassium content of the latex paint.

The tolerance of latex paints for soluble electrolyte materials is usually greater than that of the unpigmented latex. However, since the soluble electrolytes are deposited with the polymer and pigment as a film of non-volatile substances when a thin layer of the latex paint is dried by evaporation of water therefrom, large amounts of water-soluble compounds tend to increase the sensitivity of the coating film to water and to decrease its resistance to wet scrubbing.

We prefer to limit the amount of water-soluble ionizable compounds of potassium which are added to the latex paint so that the total weight of potassium and sodium, calculated as elements, in the form of water-soluble ionizable compounds thereof is not more than 2.5 per cent of the total weight of non-volatile substance in the latex paint; i. e. is not more than 2.5 per cent of the total combined weight of such compounds, copolymer, pigment and other non-volatile substances in the latex paint dispersion.

The following examples, which show ways in which the invention has been practiced, are not to be construed as limiting the invention. In the examples, parts and percentages are by weight unless otherwise specified.

*Example 1*

This example describes briefly the preparation of an efflorescent latex by a conventional process and, for contrast therewith, the preparation of a non-efflorescent latex by the improved process of the invention.

Into a polymerization vessel was charged 45 parts of a mixture of monomers and 55 parts of an aqueous solution. The mixture of monomers was 60 per cent styrene and 40 per cent butadiene, equivalent to approximately 44 mole per cent styrene and 56 mole per cent butadiene. The aqueous solution contained 1.46 per cent potassium persulfate, 1.06 per cent sodium bicarbonate and 1.6 per cent of a commercial emulsifying agent consisting of about 85 per cent by weight of the sodium salt of sulfated monoglyceride of coconut oil, the remainder being largely sodium sulfate. The mixture of monomers was dispersed into the aqueous solution with agitation, and the dispersion was heated at a temperature of about 70° C. until a decrease in pressure in the polymerization vessel indicated that the polymerization was complete. The vessel was cooled, opened, and the latex was removed. The latex product contained about 45 per cent non-volatile substances, sulfate ions equivalent to about 2.17 per cent $Na_2SO_4$, about 0.519 per cent total sodium, and about 0.515 per cent total potassium, based on the total weight of non-volatile substances. The computed total weight of sodium and potassium was 1.034 per cent of the total non-volatile substances, and the computed weight ratio of potassium to sodium was 0.99. The latex was alkaline, formed a clear, tough film when dried in a thin layer, and was suitable for making a latex paint. However, films made by drying thin layers of this latex, or paints made therefrom, effloresce, especially when exposed to temperatures of about 50° F. and relative humidity of about 80 per cent.

By employing potassium bicarbonate in place of the sodium bicarbonate used as the pH buffer in the preparation of the latex paint just described, a non-efflorescent latex is obtained. A latex prepared by polymerizing 48 parts of a mixture of 44 mole per cent styrene and 56 mole per cent butadiene in 52 parts of an aqueous solution containing 1.46 per cent potassium persulfate, 1.06 per cent potassium bicarbonate, and 1.6 per cent of the above-mentioned commercial emulsifying agent, is, like the above described latex, alkaline, and film-forming when dried in a thin layer; it contains about 48 per cent non-volatile substances and sulfate ions equivalent to about 1.93 per cent $Na_2SO_4$ based on the weight of non-volatile substances in the latex. The latex contains about 0.146 per cent total sodium and about 0.906 per cent total potassium and a computed total of sodium and potassium, as elements, of about 1.052 per cent, based on the total weight of non-volatile substances in the latex. The weight ratio of potassium to sodium is about 6.2. Films made by drying a thin layer of this latex do not effloresce, nor do latex paints made therefrom, even when exposed under conditions most favorable to efflorescence.

In the preparation of the non-efflorescent latex just described, in place of the potassium bicarbonate, there may be substituted a mixture of one part of sodium bicarbonate and two parts of potassium bicarbonate. The resulting latex has about 1.0 per cent total sodium and potassium based on non-volatile substances in the latex, the weight ratio of potassium to sodium being about 3.0, and films made from this latex are non-efflorescent.

*Example 2*

This example describes briefly the making of a conventional latex paint and the making of an improved non-efflorescent latex paint from a latex which had been modified by the addition of potassium compound.

A conventional latex paint, having a pigment-volume concentration of about 35 per cent, was made by mixing together a pigment dispersion and a latex dispersion. The pigment dispersion (often termed a "pigment slip" or "pigment slurry") was made by grinding the following composition in a pebble mill:

| | Parts |
|---|---|
| Titanium dioxide | 70 |
| Lithopone | 20 |
| Mica | 10 |
| Total pigments | 100 |
| $K_5P_3O_{10}$ (3% aqueous solution) | 16.6 |
| Sodium pentachlorophenate | 0.9 |
| Water | 36.9 |
| Total pebble mill grind or pigment slip | 154.4 |

The pigment slip was then mixed with a latex dispersion together with other materials as follows:

| | Parts |
|---|---|
| Pebble mill pigment slip | 154.4 |
| Casein (15% aqueous solution) ammonia solubilized | 16.44 |
| Phenolic preservative mixture [1] (15% aqueous solution) | 4.2 |
| Antifoamer [2] | 0.46 |
| Latex [3] | 96.0 |
| Total latex paint | 271.5 |

[1] A mixture of equal parts sodium ortho-phenylphenate and sodium pentachlorophenate.
[2] "Defoamer ED," a coconut oil derivative made by the El Dorado Oil Works.
[3] A 48% non-volatile substance latex copolymer of about 50 mole per cent styrene and 50 mole per cent butadiene, made by a conventional method similar to that described in Example 1, using sodium bicarbonate as the pH buffer.

The white paint product was tinted by adding about 16 grams per gallon of paint of a green tinting pigment, in order to make more visible any efflorescence which might develop on the dried paint films. The latex paint product so produced was applied as a thin layer to a support, dried at room temperature, and exposed in a test cabinet at a temperature of 40° F. to air of about 70–80 per cent relative humidity. The dried paint samples developed a heavy efflorescence after one day of such exposure.

The latex, from which the above described efflorescent paint was made, contained sodium sulfate. The latex paint was analyzed and found to contain 0.15 per cent sodium and 0.33 per cent potassium, based on the total weight of the paint, or about 0.27 per cent sodium and 0.59 per cent potassium, based on the non-volatile substances in the paint. These analytical data are equivalent to a total of 0.86 per cent sodium and potassium, based on the total weight of non-volatile substances in the paint, and a weight ratio of about 2.2 parts of potassium per part of sodium.

An improved, non-efflorescent latex paint was made by substituting, for the latex employed in the above paint formulation, a non-efflorescent latex. The non-efflorescent latex employed was made by modifying a separate quantity of the latex used in making the efflorescent paint just described. To 208 parts of said latex, containing 48 per cent non-volatile substances, was added 2 parts of potassium chloride. Ninety-six parts of this latex was made into a paint using the formulation described at the beginning of this example. The resultant paint was non-efflorescent. When spread in a thin layer on a support, dried at room temperature and exposed in a test cabinet at a temperature of 40° F. to air of about 70-80 per cent relative humidity, the improved paint did not effloresce, even on prolonged exposure.

The improved, non-efflorescent paint, made from latex to which potassium had been added in the form of potassium chloride, contained 0.15 per cent sodium and 0.51 per cent potassium, based on the total paint, or about 0.27 per cent sodium and 0.91 per cent potassium, based on the non-volatile substances in the paint. The improved, non-efflorescent paint therefore contained a total of 1.18 per cent sodium and potassium, based on the non-volatile substances in the paint, and a weight ratio of potassium to sodium of about 3.4.

*Example 3*

This example describes the treating of an efflorescent paint to render the same non-efflorescent, and shows the effect of the weight ratio of potassium to sodium on efflorescence.

A latex paint having a pigment volume concentration of about 35 per cent was made by mixing together a pigment dispersion and a latex dispersion. The pigment dispersion was similar to that described in Example 2 but was made, using lecithin as the pigment dispersing agent instead of potassium tripolyphosphate, by pebble-milling the following composition:

| | Parts |
|---|---|
| Titanium dioxide | 70 |
| Lithopone | 20 |
| Mica | 10 |
| Total pigments | 100 |
| Water-dispersible lecithin (20% aqueous dispersion) | 5.0 |
| Sodium pentachlorophenate (15% aqueous solution) | 6.2 |
| Water | 43.8 |
| 28% aqueous ammonia | 0.2 |
| Total pebble mill grind or pigment slip | 155.2 |

The pigment slip was then mixed with a latex dispersion together with other materials as follows:

| | Parts |
|---|---|
| Pebble mill pigment slip | 155.2 |
| Casein (15% aqueous solution), ammonia solubilized | 21.84 |
| Phenolic preservative mixture [1] (15% aqueous solution) | 4.2 |
| Antifoamer [1] | 0.46 |
| Latex [2] | 96.0 |
| Total latex paint | 277.7 |

[1] Same as described in Example 2.
[2] A commercial latex containing about 48% of a copolymer of about 50 mole per cent styrene and 50 mole per cent butadiene, with sodium bicarbonate as the pH buffer.

The white paint so produced was tinted with 16 grams per gallon of paint of green tinting pigment, as described in Example 2. The resulting paint was used as a base paint, or control, for subsequent treatment.

Potassium chloride was then added to several portions of the above paint. The treated paint compositions (identified as A through D in Table I below), and the control, were coated on supports, dried at room temperature, and exposed in a test cabinet at a temperature of about 40° F. to air of about 70-80 per cent relative humidity. The data are summarized in Table I, wherein are indicated the amount of potassium chloride added, the sodium and potassium content of the paint composition and the efflorescence, if any, of the paint films. In the column headed "KCl added" is shown the number of parts of potassium chloride aded to 100 parts of the latex paint control composition. Under "Paint composition" is shown the amount of potassium (K) and sodium (Na), calculated as elements, in parts thereof per 100 parts of the whole paint composition. From these latter data are computed the ratios of potassium to sodium as "Ratio K/Na" for each paint composition.

TABLE I

| Paint | KCl Added | Paint Composition | | Ratio, K/Na | Efflorescence |
|---|---|---|---|---|---|
| | | K | Na | | |
| Control | none | 0.17 | 0.12 | 1.42 | Heavy. |
| A | 0.083 | 0.213 | 0.12 | 1.78 | Medium. |
| B | 0.25 | 0.301 | 0.12 | 2.51 | Trace. |
| C | 0.50 | 0.43 | 0.12 | 3.58 | None. |
| D | 1.66 | 1.04 | 0.12 | 8.7 | Do. |

*Example 4*

To 100 parts of the conventional efflorescent latex paint described in Example 2 was added 0.51 part of potassium carbonate. The so-modified paint did not effloresce, when tested as described in the previous examples. The improved paint contained 0.15 per cent sodium and 0.62 per cent potassium, the ratio of potassium to sodium being 4.1.

*Example 5*

To 100 parts of each of several portions of two commercial latex paints was added 0.83 part of a water-soluble ionizable compound of potassium or mixture thereof, identified in Table II. The unmodified paint and the treated paints were separately spread on supports, dried, and the paint films exposed to conditions of low temperature and high relative humidity as hereinbefore described.

Table II shows the particular potassium compound or compounds added, the potassium and sodium content in parts per 100 parts of paint, the weight ratio of potassium to sodium in each paint, and the degree of effloresence developed on each paint film.

TABLE II

| Commercial Latex Paint | K-Compound Added | Paint Composition | | Ratio, K/Na | Efflorescence |
|---|---|---|---|---|---|
| | | K | Na | | |
| A | none | 0.12 | 0.17 | 0.71 | Heavy. |
| A | K₃PO₄ | 0.58 | 0.17 | 3.41 | None. |
| A | K₄P₂O₇ | 0.51 | 0.17 | 3.00 | Do. |
| B | none | 0.33 | 0.14 | 2.36 | Heavy. |
| B | KHCO₃+K₂CO₃ [1] | 0.73 | 0.14 | 5.21 | None. |
| B | KHCO₃ | 0.65 | 0.14 | 4.64 | Do. |
| B | KH₂PO₄ | 0.57 | 0.14 | 4.06 | Do. |

[1] A mixture of equal parts KHCO₃ and K₂CO₃.

*Example 6*

A number of efflorescent commercial latex paints were analyzed for sodium and potassium, using a conventional flame-photometer method of determination. From these data was computed the amount of potassium tripolyphosphate necessary to be added in order to make the weight ratio of potassium to sodium equal to 3. The calculated amount of $K_5P_3O_{10}$ was then added to each paint and the treated paints and the untreated commercial paints were then tested for efflorescence as hereinbefore described. These data are shown in Table III, wherein the analyses and calculated potassium to sodium ratios are shown for each of the commercial paints, the analyses being in parts of the element in 100 parts of the total paint. The amount of added $K_5P_3O_{10}$ is also shown in parts per 100 parts of total paint.

TABLE III

| Commercial Latex Paint | $K_5P_3O_{10}$ Added | Paint Composition | | Ratio, K/Na | Efflorescence |
|---|---|---|---|---|---|
| | | K | Na | | |
| A | none | 0.094 | 0.16 | 0.59 | Medium. |
| A | 0.888 | 0.48 | 0.16 | 3.0 | None. |
| B | none | 0.14 | 0.26 | 0.54 | Heavy. |
| B | 1.47 | 0.78 | 0.26 | 3.0 | None. |
| C | none | 0.12 | 0.22 | 0.55 | Heavy. |
| C | 1.24 | 0.66 | 0.22 | 3.0 | None. |
| D | none | 0.082 | 0.47 | 0.175 | Heavy. |
| D | 3.06 | 1.41 | 0.47 | 3.0 | None. |
| E | none | 0.018 | 0.11 | 0.165 | Light. |
| E | 0.716 | 0.33 | 0.11 | 3.0 | None. |
| F | none | 0.053 | 0.19 | 0.28 | Heavy. |
| F | 1.19 | 0.57 | 0.19 | 3.0 | None. |
| G | none | 0.017 | 0.18 | 0.095 | Heavy. |
| G | 1.20 | 0.54 | 0.18 | 3.0 | None. |

We claim:

1. A method of making a coating composition that, when dried as a thin layer, forms a non-efflorescent film, which method comprises forming an aqueous dispersion comprising from 25 to 70 parts by weight of a copolymer of polymerizable unsaturated organic compounds, including at least 15 mole per cent of a monovinyl aromatic hydrocarbon of the benzene series and between 40 and 60 mole per cent of an aliphatic conjugated diolefin of the class consisting of butadiene and isoprene, and from 75 to 30 parts by weight of an alkaline aqueous solution of ionizable alkali compounds, which in the solution yield potassium, sodium and sulfate ions, and which alkali compounds contain a total of at least three parts, by weight, of potassium per part of sodium, the total weight of alkali ions chemically combined in the ionizable compounds being from 0.35 to 2.5 per cent by weight of the solids content of the dispersion.

2. A method as claimed in claim 1, wherein a pigment is added to the aqueous dispersion of the copolymer to form a paint in which the ratio of potassium to sodium in the form of water-soluble ionizable compounds is at least three to one by weight.

3. A method as claimed in claim 1, wherein a pigment and a further amount of water-soluble ionizable compounds of sodium and potassium are added to the aqueous dispersion of the copolymer to form a paint, the compounds of sodium and potassium being added in relative proportion such that the paint contains at least three parts, by weight, of potassium per part of sodium, the total alkali ions being not more than 2.5 per cent by weight of the solids content of the paint.

4. A method of making a latex that, when dried as a thin layer, forms a non-efflorescent film, which method comprises dispersing from 25 to 70 parts by weight of a mixture of polymerizable unsaturated organic compounds, including at least 15 mole per cent of a monovinyl aromatic hydrocarbon of the benzene series and between 40 and 60 mole per cent of an aliphatic conjugated diolefin of the class consisting of butadiene and isoprene, in from 75 to 30 parts by weight of an alkaline aqueous medium containing an emulsifying agent, a catalyst for the polymerization, and an alkaline pH buffering agent, and comprising ionizable alkali compounds which in aqueous solution yield potassium, sodium and sulfate ions, and which alkali compounds contain a total of at least three parts, by weight, of potassium per part of sodium, the total weight of alkali ions chemically combined in the ionizable compounds being from 0.35 to 1 per cent of the combined weight of said alkali compounds and the mixture of polymerizable unsaturated organic compounds, and polymerizing said mixture of polymerizable unsaturated organic compounds while dispersed in said alkaline aqueous medium by heating at a polymerization temperature until the polymerization is substantially complete to form a dispersion of a copolymer of said polymerizable unsaturated organic compounds.

5. A method of making a coating composition that, when dried as a thin layer, forms a non-efflorescent film, which method comprises treating an aqueous dispersion comprising from 25 to 70 parts by weight of a copolymer of polymerizable unsaturated organic compounds, including at least 15 mole per cent of a monovinyl aromatic hydrocarbon of the benzene series and between 40 and 60 mole per cent of an aliphatic conjugated diolefin of the class consisting of butadiene and isoprene, and from 75 to 30 parts by weight of an alkaline aqueous solution of ionizable alkali compounds, which in solution yield potassium, sodium and sulfate ions and which alkali compounds contain less than three parts, by weight, of potassium per part of sodium, which dispersion, when dried as a thin layer, forms an efflorescent film, by adding to said dispersion at least one water-soluble ionizable compound of potassium in amount such that there are present in the coating composition, in the form of water-soluble ionizable compounds, at least three parts, by weight, of potassium per part of sodium, the total alkali ions being from 0.35 to 2.5 per cent by weight of the solids content of the coating composition.

6. A method as claimed in claim 5, wherein a pigment and a further amount of water-soluble ionizable compounds of sodium and potassium are added to the treated aqueous dispersion of the copolymer to form a paint, the compounds of sodium and potassium being added in relative proportion such that the paint contains at least three parts, by weight, of potassium per part of sodium, the total alkali ions being from 0.35 to 2.5 per cent by weight of the solids content of the paint.

7. A method as claimed in claim 6, wherein the copolymer is a copolymer of between 60 and 40 mole per cent of a monovinyl aromatic hydrocarbon of the benzene series and between 40 and 60 mole per cent of an aliphatic conjugated diolefin of the class consisting of butadiene and isoprene.

8. A method as claimed in claim 6, wherein the copolymer is a copolymer of between 60 and 40 mole per cent styrene and between 40 and 60 mole per cent butadiene.

9. A method as claimed in claim 5, wherein a pigment is added to the treated aqueous dispersion of the copolymer to form a paint in which the ratio of potassium to sodium in the form of water-soluble ionizable compounds is at least three to one by weight.

10. A method which comprises treating a latex paint that, when dried as a thin layer, forms an efflorescent film, which latex paint contains a pigment intimately mixed with an aqueous dispersion comprising from 25 to 70 parts by weight of a copolymer of polymerizable unsaturated organic compounds, including at least 15 mole per cent of a monovinyl aromatic hydrocarbon of the benzene series and between 40 and 60 mole per cent of an aliphatic conjugated diolefin of the class consisting of butadiene and isoprene, and from 75 to 30 parts by weight of an alkaline aqueous solution of ionizable alkali compounds which in solution yield potassium, sodium and sulfate ions and which alkali compounds contain less than three parts, by weight, of potassium per part of sodium, by adding to said latex paint at least one water-soluble ionizable compound of potassium in amount such that there are present in the treated latex paint, in the form of water-soluble ionizable compounds, at least three parts, by weight, of potassium per part of sodium, the total alkali ions being from 0.35 to 2.5 per cent by weight of the solids content of the paint, thereby making a latex paint that, when dried as a thin layer, forms a non-efflorescent film.

11. A method of treating a latex paint as claimed in claim 10, wherein the copolymer is a copolymer of between 60 and 40 mole per cent of a monovinyl aromatic hydrocarbon of the benzene series and between 40 and 60 mole per cent of an aliphatic conjugated diolefin of the class consisting of butadiene and isoprene.

12. A method of treating a latex paint as claimed in claim 10, wherein the copolymer is a copolymer of between 60 and 40 per cent of styrene and between 40 and 60 mole per cent of butadiene.

13. A coating composition that, when dried as a thin layer, forms a non-efflorescent film, which comprises an intimate mixture of a pigment and an aqueous dispersion comprising from 25 to 70 parts by weight of a copolymer of polymerizable unsaturated organic compounds, including at least 15 mole per cent of a monovinyl aromatic hydrocarbon of the benzene series and between 40 and 60 mole per cent of an aliphatic conjugated diolefin of the class consisting of butadiene and isoprene, and from 75 to 30 parts by weight of an alkaline aqueous solution of ionizable alkali compounds, which in the solution yield potassium, sodium and sulfate ions, and which alkali compounds contain a total of at least three parts, by weight, of potassium per part of sodium, the total alkali ions being from 0.35 to 2.5 per cent by weight of the solids content of the composition.

14. A coating composition as claimed in claim 13, wherein the copolymer is a copolymer of between 60 and 40 mole per cent of a monovinyl aromatic hydrocarbon of the benzene series and between 40 and 60 mole per cent of an aliphatic conjugated diolefin of the class consisting of butadiene and isoprene.

15. A coating composition as claimed in claim 13, wherein the copolymer is a copolymer of between 60 and 40 mole per cent styrene and between 40 and 60 mole per cent butadiene.

16. A coating composition that, when dried as a thin layer, forms a non-efflorescent film, which composition comprises an intimate mixture of a pigment and a dispersion of a copolymer in an aqueous medium, wherein the combined weight of the pigment and the copolymer is between 40 and 65 per cent of the total weight of the composition, the amount of copolymer being from 15 to 100 parts, by weight, per 100 parts of the pigment, said copolymer consisting of from 60 to 40 mole per cent styrene and from 40 to 60 mole per cent butadiene, and wherein the aqueous medium has a pH between 9 and 10 and is a solution of ionizable alkali compounds which, in solution, yield potassium, sodium, and sulfate ions, and which alkali compounds contain a total of at least three parts, by weight, of potassium per part of sodium, the total weight of potassium and sodium in the form of soluble ionizable compounds being from 0.35 to 2.5 per cent of the combined weight of said compounds, copolymer and pigment in the coating composition.

References Cited in the file of this patent

UNITED STATES PATENTS

| Number | Name | Date |
|---|---|---|
| 2,498,712 | Ryden | Feb. 28, 1950 |